(12) United States Patent
Berens

(10) Patent No.: US 12,446,555 B1
(45) Date of Patent: Oct. 21, 2025

(54) AUTOMATED HEN HOUSE MONITORING DEVICE

(71) Applicant: Daniel Berens, Sheridan, WY (US)

(72) Inventor: Daniel Berens, Sheridan, WY (US)

( * ) Notice: Subject to any disclaimer, the term of this patent is extended or adjusted under 35 U.S.C. 154(b) by 0 days.

(21) Appl. No.: 18/739,207

(22) Filed: Jun. 10, 2024

(51) Int. Cl.
*A01K 31/00* (2006.01)
*A01K 31/16* (2006.01)
*A01K 31/20* (2006.01)

(52) U.S. Cl.
CPC .......... *A01K 31/005* (2013.01); *A01K 31/165* (2013.01); *A01K 31/20* (2013.01)

(58) Field of Classification Search
CPC ....................................................... A01K 31/18
USPC ....................................................... 340/573.3
See application file for complete search history.

(56) References Cited

U.S. PATENT DOCUMENTS

| | | | | | |
|---|---|---|---|---|---|
| 4,920,923 | A * | 5/1990 | Hosoya | .................. | A01K 45/00 119/51.02 |
| 7,317,969 | B2 * | 1/2008 | Lorton | ..................... | F24F 11/52 700/275 |
| 8,915,215 | B1 * | 12/2014 | Helgeson | ............... | A01K 45/00 119/421 |
| 9,713,318 | B1 * | 7/2017 | Albawi | .................. | G08C 17/02 |
| 9,775,329 | B1 * | 10/2017 | Miller | ..................... | A01K 31/02 |
| 10,782,681 | B1 * | 9/2020 | Slavin | ..................... | G06Q 50/10 |
| 2012/0299731 | A1 * | 11/2012 | Triener | ................... | G16Z 99/00 702/19 |
| 2014/0261189 | A1 * | 9/2014 | Chait | ..................... | A01K 45/00 119/6.8 |
| 2015/0136862 | A1 * | 5/2015 | Wolf, II | .................. | F24S 10/80 236/1 C |
| 2016/0246934 | A1 * | 8/2016 | Dunlop | .................. | G16H 70/20 |
| 2019/0012497 | A1 * | 1/2019 | Ralston | ................ | A01K 11/006 |
| 2019/0098874 | A1 * | 4/2019 | Burton | .................. | A01K 29/005 |
| 2019/0254260 | A1 * | 8/2019 | Nguyen | .................... | G07C 9/30 |
| 2020/0260695 | A1 * | 8/2020 | Rosales | .................. | A01K 31/16 |
| 2020/0296938 | A1 * | 9/2020 | Luce | ...................... | A01K 31/02 |
| 2022/0125021 | A1 * | 4/2022 | Herborn | .................. | G10L 25/63 |
| 2022/0394956 | A1 * | 12/2022 | Nagatomo | ............... | G01G 9/00 |
| 2023/0019190 | A1 * | 1/2023 | Shamsuddin | ............ | G06T 7/20 |
| 2024/0381849 | A1 * | 11/2024 | Forsythe | .............. | A01K 29/005 |

* cited by examiner

Primary Examiner — Monica L Perry
Assistant Examiner — Brittany A Lowery

(57) ABSTRACT

A system for monitoring a hen house for raising hens and collecting eggs is described. The system includes a controller, a plurality of sensors for receiving sensor data of the hen house, and a plurality of actuators for performing commands. The controller includes a processor configured to execute operations of receiving the sensor data. Given sensor data and a set of predetermined rules, the present technology generates trend data. The trend data indicates a state of the hen house and an estimation of next steps needed to raise the hens and to collect hens. The present technology includes generating dashboard data for displaying the state to a user using a client device. The system further includes determining a command for respective actuators of the hen house to execute. The actuators execute the commands to enable users in non-industrial, private settings to raise hens and collect eggs.

15 Claims, 8 Drawing Sheets

| Command Rules 302 | |
|---|---|
| Condition 304 | Command 306 |
| Weight on Laying Box is higher than Average | Generate an alert to check the egg laying box; a hen might be sitting on the egg laying box |
| Water temperature is below a predetermined threshold of a freezing point | Activate the water heater to prevent the water from freezing |
| Outdoor temperature is lower than a threshold | Keep the door open beyond normal time for closing the door to prevent shutting out hens outside during a cold temperature |
| A count of hens inside the hen house is below a threshold; | Activate the treat/vitamin dispenser ON; Delay the door closure for a predetermined time to prevent the hens from being trapped outside. |
| Temperature inside the house is higher than a predetermined threshold | Generate a warning notice that includes effects of a time lapse and temperature levels on eggs as the eggs may spoil. Activate the exhaust fan to generate air movement within the house and keep the eggs cool. |

FIG. 3

AUTOMATED HEN HOUSE MONITORING DEVICE

BACKGROUND

Raising hens (e.g., chickens, and other bird animals alike) for collecting eggs has been performed in both industrial and private home settings with distinct needs in the respective settings. In industrial settings, techniques for automating processes for raising a large number of hens (e.g., tens of thousands of hens) and collecting eggs have become commonplace. These technologies for the industrial settings enable improving efficiency of mass production of eggs.

In contrast, raising hens in the private home settings are small in its scale. For example, private individuals may have limited time and may thus raise fewer hens and therefore collect substantially fewer eggs than industrial settings. Raising hens and collecting eggs in the private settings are manually intensive. Examples of the manual operations include controlling a temperature of a hen house in a backyard of a house, feeding food and supplements to the hens, and regularly checking and collecting eggs.

There have been increasing needs for a system that helps the private individuals to raise hens, monitor the hen house, and check for eggs more conveniently. Technologies for large-scale deployments in the industrial setting are often unsuitable for the private home setting because systems for use in the industrial setting are complex. Further, the systems for use in the industrial setting are often expensive to deploy and maintain. Accordingly, there have been needs for simplistic and yet efficient tools and systems for private use, without the need for extensive training to understand and follow directions.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to a system and a device for monitoring a hen house, hens, and/or eggs, and additionally, or alternatively, for maintaining hens for collecting eggs in private settings. For example, the disclosed aspects improve raising hens in a backyard. Collecting sensor data for a hen house (also referred to herein as a coup) may thus enable users to analyze, predict, and respond to conditions of the hen house, the hens, and the eggs effectively. The disclosed aspects enable the user to anticipate and optimize costs, a quantity of eggs to be collected, the wellbeing of hens, and/or resource consumption, among other examples. By utilizing home automation features, the disclosed aspects thus provide novice users with a 'plug-and-play' experience out of the box. A device according to the disclosed aspects uses Wi-Fi and a convenient application to display a dashboard for monitoring, tracking, and controlling the coup environment. In examples, the device includes a powered control unit with a display screen and accepts multiple compatible devices capable of dispensing food, water, and/or treats. In examples, the powered control unit is weatherproof for protecting the device from wet conditions and varying temperature conditions of the hen house. In some examples, the control unit also controls ventilation, lights, and/or a door for hens to access to the exterior yard. Thus, the disclosed aspects make caring for hens by owners more humane, sustainable, convenient, and enjoyable, among other benefits.

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example of conditions and commands in accordance with aspects of the present disclosure.

FIGS. 4A-D illustrate examples of graphical user interface in accordance with aspects of the present disclosure.

Figure 5:
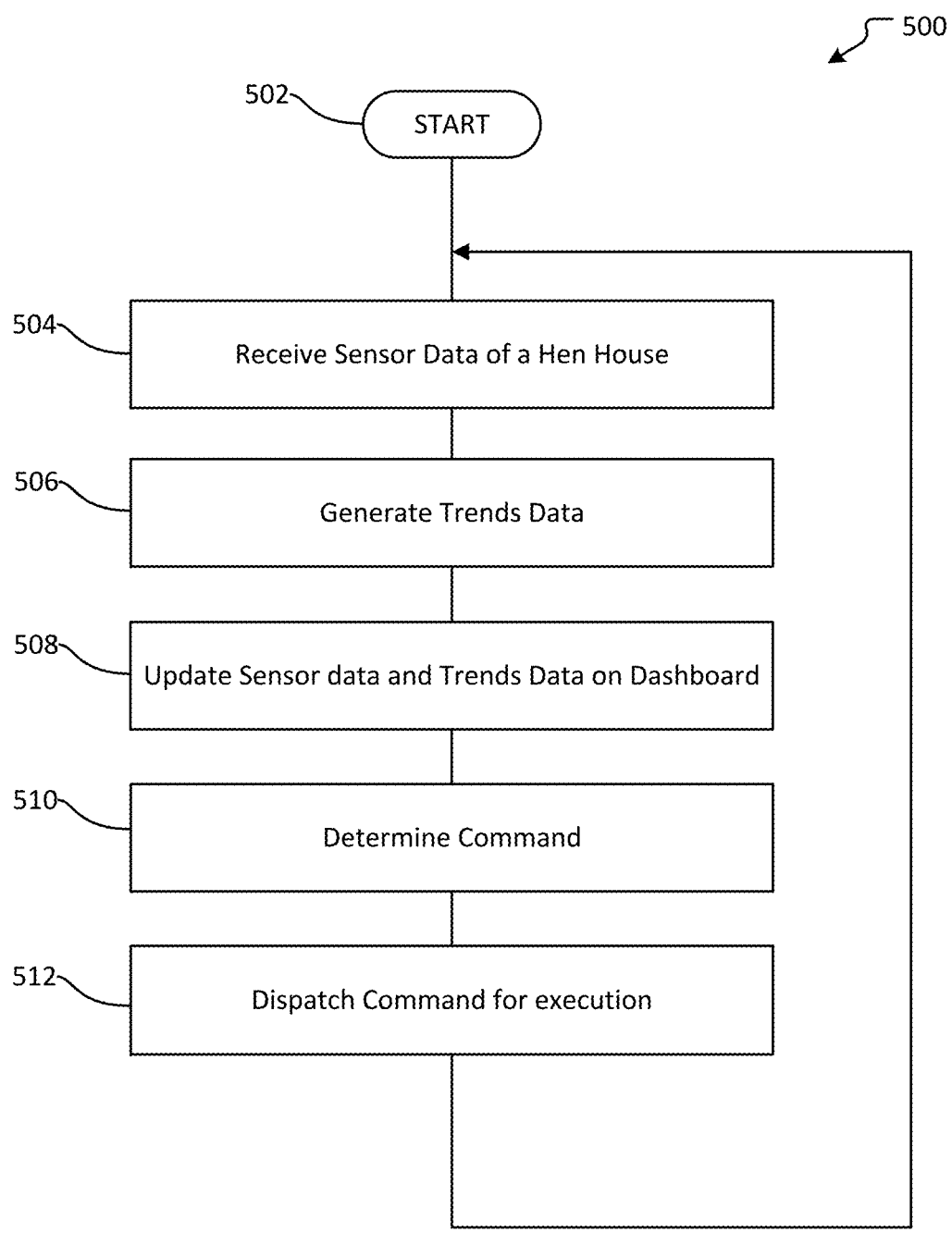

FIG. 5 illustrates an example method for monitoring and maintaining an automated hen house in accordance with aspects of the present disclosure.

Figure 6:
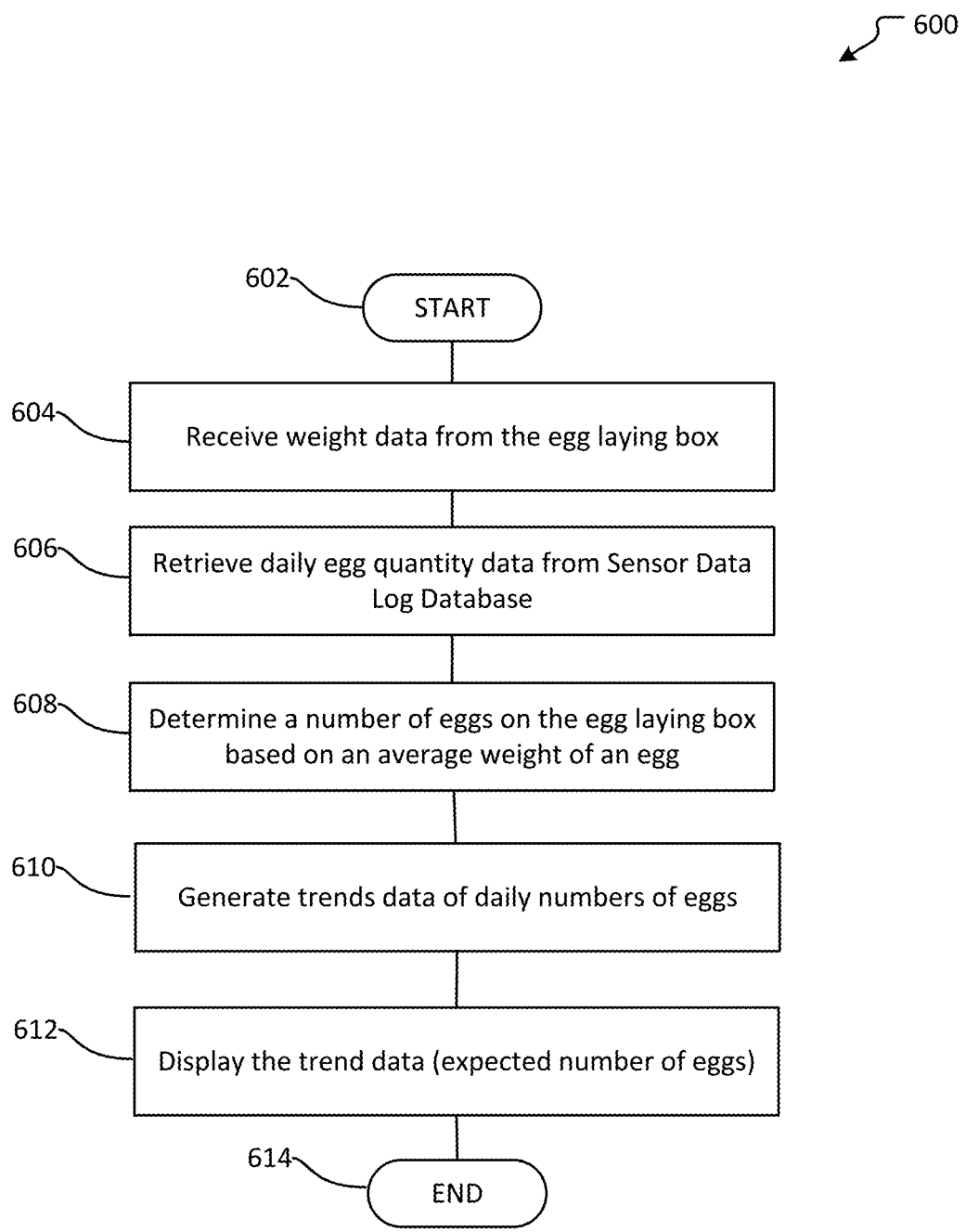

FIG. 6 illustrates an example method for monitoring eggs in accordance with aspects of the present disclosure.

Figure 7:
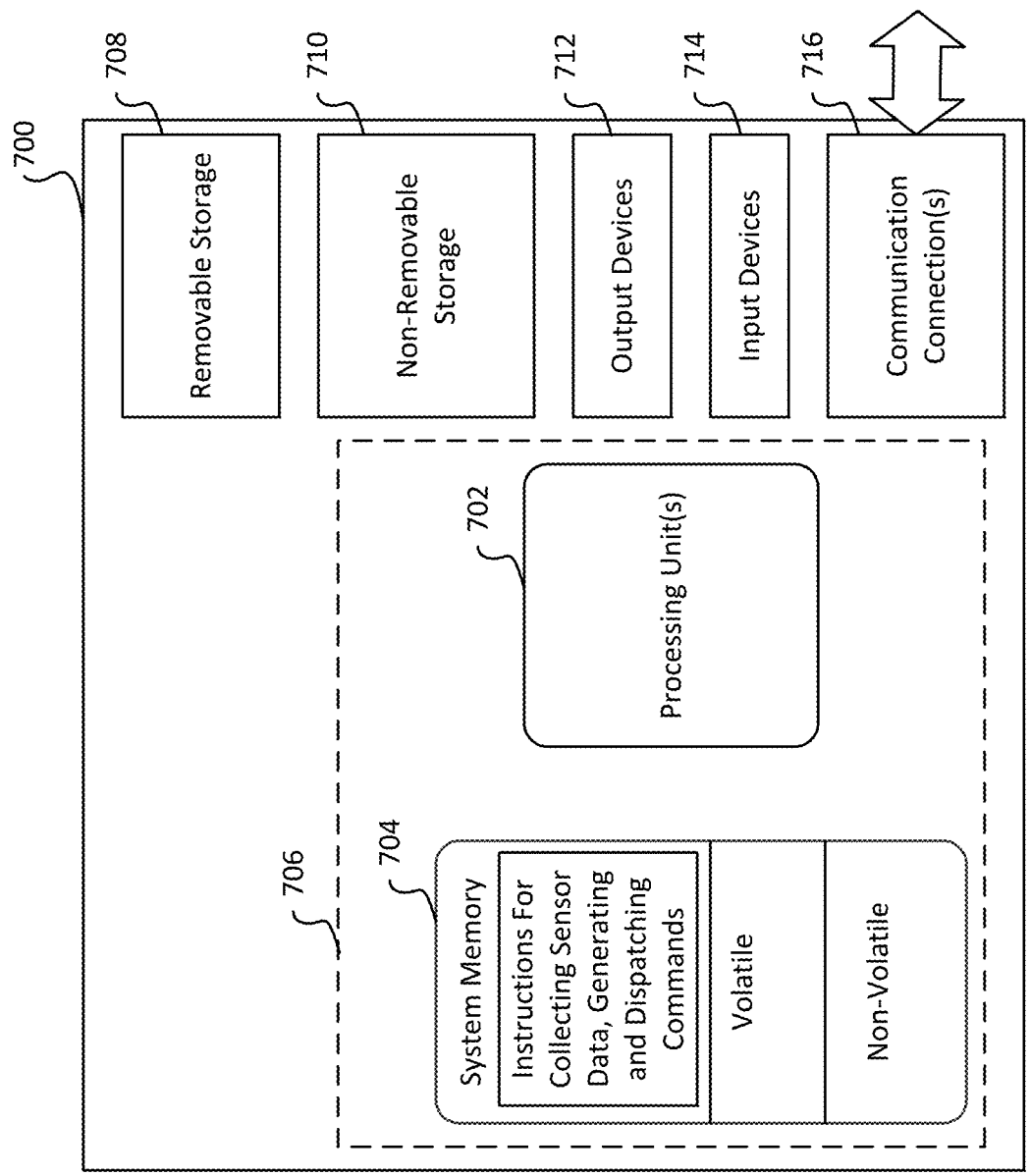

FIG. 7 illustrates a simplified block diagram of a device with which aspects of the present disclosure may be practiced in accordance with aspects of the present disclosure.

DETAILED DESCRIPTION

Various aspects of the disclosure are described more fully below with reference to the accompanying drawings, which form a part hereof, and which show specific example aspects. However, distinct aspects of the disclosure may be implemented in many different ways and should not be construed as limited to the aspects set forth herein; rather, these aspects are provided so that this disclosure will be thorough and complete and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

The practice of raising hens and/or collecting eggs has been performed globally for centuries. In particular, maintaining hens and collecting eggs in an agricultural industrial setting have shown substantial improvements in automating the practice for mass-producing eggs in large sale operations.

In contrast, in private home settings, raising hens for laying eggs and collecting eggs has been time-consuming and involves manually-intensive operations. The operation often includes visiting the hen house regularly to monitor conditions of the hen house and the hens. The well-being of hens may be affected by a variety of factors including temperature and availability of food in the hen house. Further, private individuals who wish to raise hens and collect eggs in the private home setting may also lack knowledge and experience to operate successfully.

The present disclosure addresses these and other issues by providing a system and method to automatically monitor, alert, and operate a hen house in the private home setting. In particular, the present disclosure provides a controller device that is installed in a coup. In aspects, the controller device connects to one or more sensors to collect data from the coup and surroundings. In some aspects, the controller further connects to actuators to operate devices in the coup. In examples, the controller sends commands to the actuators that thus perform one or more operations according to the commands. In another example, the controller further generates a dashboard screen for display on a client device (e.g., a smartphone) at a remote location. In aspects, the dashboard screen indicates summarized information about the hen house and/or enables a user to manage various aspects of the controller device (e.g., to manually control the actuators).

The disclosure includes a method to monitor conditions of a hen house using sensors. Given the monitored conditions, the present technology may generate trend data, for example relating to raising hens and/or collecting eggs in a coup. Additionally, or alternatively, one or more recommendations are generated and presented to a user, for example for responding to the trend data. In examples, the trend data and recommendations are provided to the user via the user's smartphone or other client device, as the user may be at a remote location.

In aspects, the present disclosure enables private individuals (also referred to herein as users), who may be novices in raising hens, to raise hens and collect eggs by monitoring conditions of the hen house, the hens, and/or the eggs and conveniently displaying the monitored conditions on a dashboard of an application on a smartphone and/or on other client devices. The present disclosure further enables the users to respond to given conditions, for example by remotely selecting commands to actuate devices and control a variety of features (e.g., a food dispenser, a heater, a door of the hen house, and the like). In aspects, the dashboard further provides a recommendation to a given condition of the hen house, as may be generated by using a set of rules, conditional parameters, and/or pretrained predictive models, among other examples.

Figure 1:
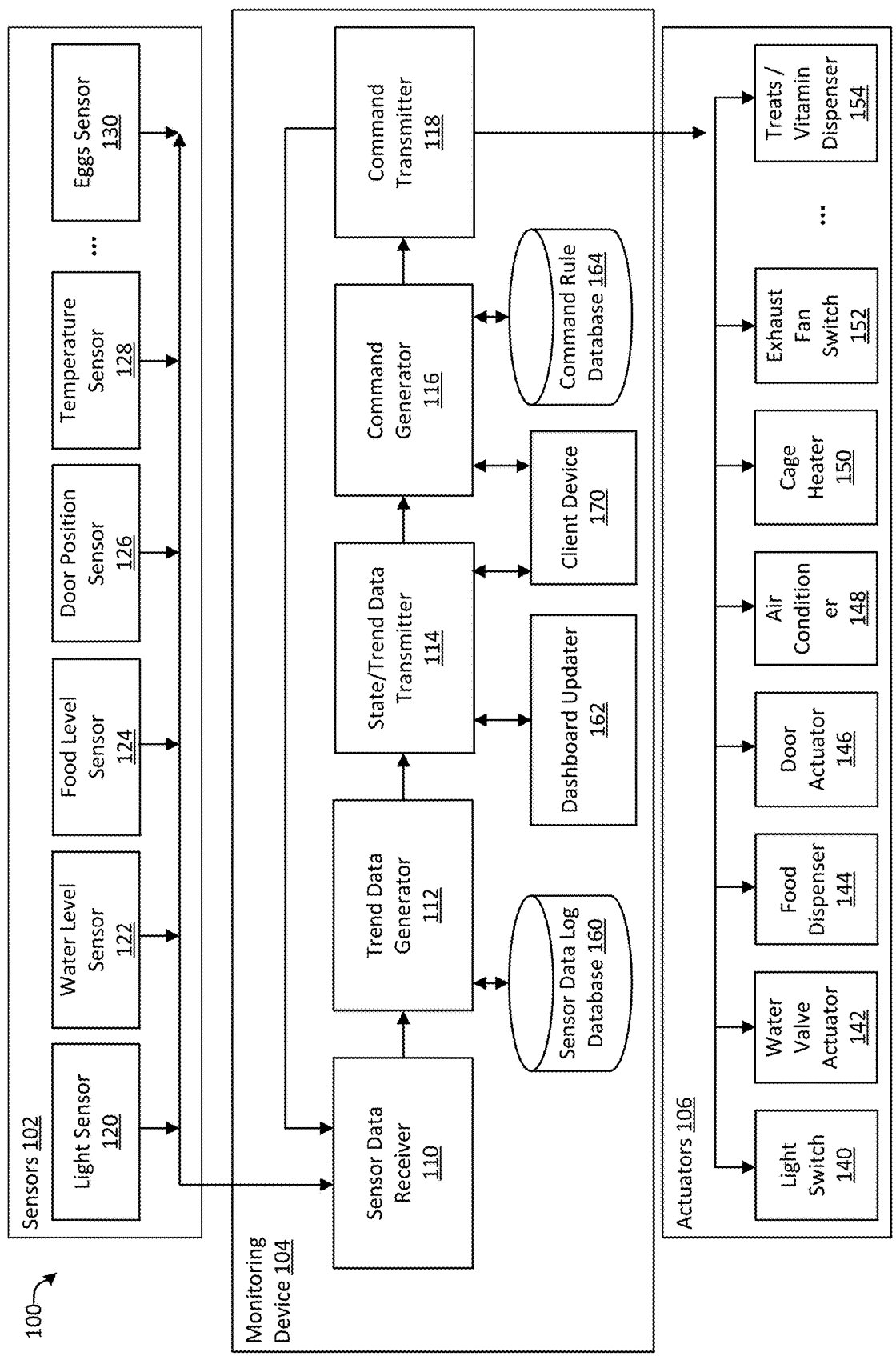
FIG. 1 illustrates an overview of an example system in which a monitoring device operates with sensors and actuators in accordance with aspects of the present disclosure.

FIG. 1 illustrates an overview of an example system in which a monitoring device is used in accordance with aspects of the present disclosure. A system 100 includes sensors 102, monitoring device 104, and actuators 106. The sensors 102 include a plurality of types of sensors for collecting data of the hen house. In aspects, the sensors 102 include light sensor 120, water state sensor 122, food state sensor 124, door position sensor 126, temperature sensor 128, and eggs sensor 130. The monitoring device 104 includes various operational parts to receive sensor data from the sensors 102, generate trend data, generate a dashboard data for displaying the sensor and/or trend data, transmitting the dashboard data, generate a command, and/or transmit the command to the actuators 106, among other examples. In examples, the monitoring device 104 includes sensor data receiver 110, trend data generator 112, state/trend data transmitter 114, command generator 116, command transmitter 118, sensor data log database 160, dashboard updater 162, and command rule database 164. In some examples, the sensor data log database 160 and the dashboard updater 162, and the command rule database 164 may be a part of the monitoring device 104. In some other examples, a server (not shown in FIG. 1) may include databases that store sensor data log, dashboard data, and command rules. The server (not shown in FIG. 1) may further include a dashboard updater.

The light sensor 120 generates status data of brightness inside and/or outside (e.g., in vicinity of) the hen house. Additionally, or alternatively, the light sensor 120 maintains a status of one or more lights inside and/or outside the hen house. The water state sensor 122 collects data of an amount of water or a water level of water in a water dispenser and/or in a water tank in the hen house. The food state sensor 124 generates data indicating an amount of food in a food dispenser in the hen house. The door position sensor 126 generates status data that describe a position of a door of the hen house. Hens move in and/or out of the hen house when the door is in an open position. The closed position of the door prevents the hens from going outside or inside the hen house. The temperature sensor 128 generates temperature data relating to the inside and/or the outside of the hen house. The eggs sensor 130 collects data that describes a number of eggs in an egg laying box (e.g., egg laying box 216 in FIG. 2). In aspects, the eggs sensor 130 collects weight data of the egg laying box and/or comprises an image sensor such that resulting image data is evaluated to identify the presence and/or quantity of eggs therein. In examples, the sensors 102 collect data at a predetermined time interval. In some other examples, the sensors 102 collect data in response to a command instruction (e.g., from a monitoring device 104) and/or in response to an occurrence of an event, among other examples. While example sensors are illustrated, it will be appreciated that fewer, additional, and/or alternative sensors may be used in other examples.

The actuators 106 includes various actuators to operate various parts of the hen house (e.g., according to a command). In examples, the actuators 106 include light switch 140, water valve actuator 142, food dispenser 144, door actuator 146, heater/ventilator/air conditioner (hereinafter "HVAC system") 148, cage heater 150, exhaust fan switch 152, and treats/vitamin dispenser 154. While example actuators are illustrated, it will be appreciated that fewer, additional, and/or alternative actuators may be used in other examples.

The light switch 140 sets a state of lights (e.g., on, off, or an intermediate brightness level) inside and/or outside of the hen house. The water valve actuator 142 sets a state of a water intake valve of a water pipe for adding water to the water dispenser in the hen house. The food dispenser 144 dispenses food in the hen house by supplying food. The door actuator 146 opens and/or closes the door to the hen house. The HVAC system 148, when its state is ON, cools and/or warms inside the hen house. In examples, the HVAC system 148 includes a heater and a cooler of the hen house. The cage heater 150 turns ON and turns OFF a heater inside one or more cages. Use of the heater thus enables maintaining a temperature inside the hen house at a comfort level for the hens in cold days and nights. The exhaust fan switch 152 turns ON and turns OFF a switch of an exhaust fan of the hen house. For example, the fan, when it is on, exhausts air from inside the hen house to the outside. Treats/vitamin dispenser 154, when it is ON, dispenses treats and vitamins in the hen house. In aspects, the treat/vitamin dispenser 154 may be used to dispense a treat to attract hens toward inside the hen house. For example, an indication is provided to treat/vitamin dispenser 154 as to a quantity of treats and/or amount of time during which treats are released.

In the monitoring device 104, the sensor data receiver 110 receives sensor data from respective sensors of the sensors 102. The trend data generator 112 generates trend data of a state of the hen house, for example based on the received sensor data from the sensors 102. In aspects, the trend data indicate one or more states of the hen house, the hens, and/or the laid eggs, which may need attention from the user. Examples of trend data may include, but are not limited to, a rising temperature inside the hen house as sensed by the temperature sensor 128, a water level below a predetermined threshold as sensed by the water state sensor 122, a food level below a predetermined threshold as sensed by the food state sensor 124, the presence of one or more eggs (e.g., as may be detected based on weight of an egg laying box by the egg sensor 130), and/or whether the door was left open for more than a predetermined threshold time or a time of the day as sensed by the door position sensor 126, and the like.

In aspects, the trend data generator 112 stores the generated trend data and/or the received sensor data in a sensor data log in a sensor data log database 160. The sensor data log database 160 stores the received sensor data and/or the generated trend data as indexed by one or more index variables. The one or more index variables include, but are not limited to, date, time, a number of eggs, and the like.

Figure 2:
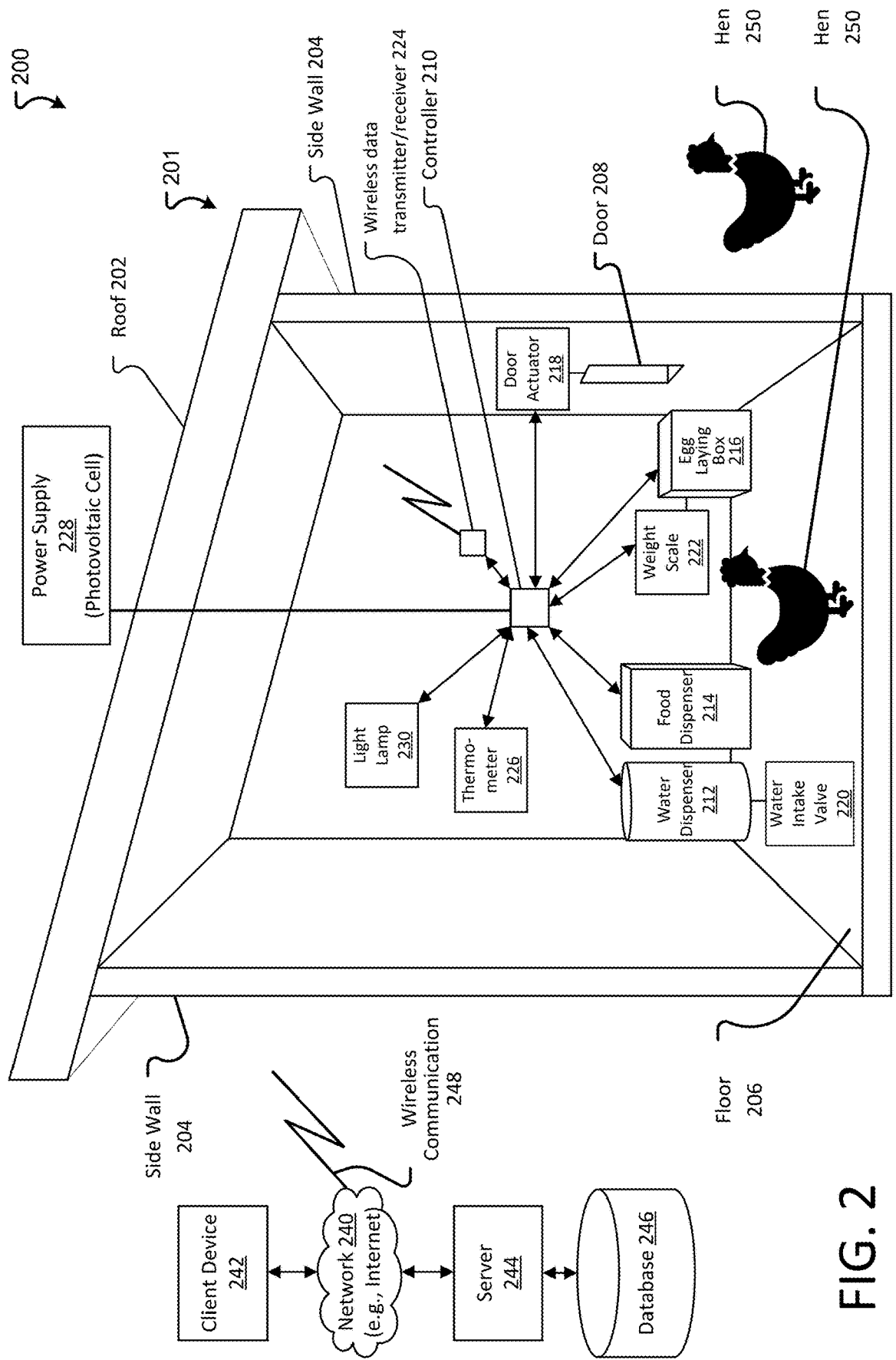
FIG. 2 illustrates an overview of an example hen house and a monitoring device in accordance with aspects of the present disclosure.

The state/trend data transmitter 114 transmits one or more state data of sensors and the trend data to an application for display on a client device 170 (e.g., a smartphone) used by the user. In aspects, the state/trend data transmitter 114 may transmit the state/trend data to dashboard updater 162. The dashboard updater 162 updates content of a dashboard for display on the client device. The dashboard is an area of a display screen of the client device 170 for displaying an overview of the state of the hen house and the trend data of the hen house, the hens, and the eggs. In examples, the display is interactive, for example enabling a user to view different trends, scale graphical representation of such trends, and/or configure which data and/or trends are displayed by the dashboard, among other examples. The dashboard updater 162 sends the updated content of the dashboard to the state/trend data transmitter 114 to transmit the updated content of the dashboard data to the client device 170 over the network (not shown in FIG. 1; e.g., the network 240 (e.g., Internet) as shown in FIG. 2. Additionally, or alternatively, updated content is transmitted directly by dashboard updater 162 and/or at least a part of such processing may be performed local to client device 170, among other examples.

The command generator 116 generates a command for execution by one or more of actuators in the actuators 106. In aspects, the command generator 116 generates the command based on the received state data of one or more sensors in the sensors 102 and/or the trend data as generated by the trend data generator 112.

Examples of a command include, but are not limited to, turning ON/OFF the lights by the light switch 140, opening/closing the water valve actuator 142, dispensing food by the food dispenser 144, opening/closing a door of the hen house by the door actuator 146, turning ON/OFF the HVAC system 148, turning ON/OFF a heater by the cage heater 150, turning ON/OFF the exhaust fan of the hen house by the exhaust fan switch 152, and dispensing treats and/or vitamins by the treats/vitamin dispenser 154. While example binary ON/OFF commands are provided, it will be appreciated that, in other examples, a command is generated to partially actuate one of actuators 106 (e.g., to set lights to a certain brightness level or to partially open the door of the hen house). In aspects, the command generator 116 generates the command according to one or more command rules. A command rule describes an instance in which one or more commands are generated, for example based on the received state data and/or the trend data. Command rule database 164 stores the one or more command rules. In aspects, the one or more command rules include a predetermined rule.

In aspects, a command rule indicates turning ON the light when a sensed degree of brightness inside the hen house is less than a predetermined threshold value and/or during specific times of the day. In some aspects, When a weight on an egg laying box becomes higher than a predetermined average weight, the controller generates an alert for display on a client device (e.g., client device 170) to check the egg laying box. For example, such an alert may indicate that a hen is sitting on the egg laying box.

In some other aspects, when water temperature becomes below a predetermined threshold within the freezing point of water, the controller activates the water heater to prevent the water from freezing. When an outdoor temperature becomes lower than a predetermined threshold temperature, the controller actuates the door to keep the door open beyond predetermined (e.g., normal) time for closing the door. Keeping the door open would prevent shutting the hens outside the hen house during a cold temperature. When a count of hens inside becomes less than a predetermined threshold count, the controller directs the treats/vitamin dispenser 154 to dispense treats and/or vitamins and delay the door closure for a predetermined time. The combination of actuating the treats/vitamin dispenser 154 and the door actuator 146 attracts hens inside the hen house to prevent the hens from being trapped outside the hen house. Further, when a temperature inside the hen house becomes higher than a predetermined threshold temperature, the controller generates a warning notice for display on the client device. The warning notice includes an indication that the eggs may spoil if the temperature inside the hen house is elevated for a prolonged period of time. The controller further activates the exhaust fan to generate air movement inside the hen house and to keep the eggs cool. Such rules are provided for illustrative purposes, and it will therefore be appreciated that any of a variety of additional and/or alternative rules may be used in other instances.

The command transmitter 118 transmits a command generated by the command generator 116 to one or more actuators of the actuators 106. In response to receiving the command, respective actuators of the actuators 106 perform the command.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein. For example, client device 170 may additionally or alternatively evaluate a set of rules, such that it transmits one or more commands to actuators 106 accordingly. Similarly, such commands may be transmitted by client device 170 in response to manual input that is received from a user of client device 170.

FIG. 2 illustrates an overview of an example system with a hen house and a monitoring device in accordance with aspects of the present disclosure. The example system 200 includes a hen house 201, a controller 210, a client device 242, and a server 244. The hen house 201 includes roof 202, side wall 204, floor 206, door 208. In examples, the controller 210 is installed inside or in vicinity of the hen house 201. Aspects of controller 210 (along with other aspects of system 200) may be similar to those discussed above with respect to monitoring device 104 (and system 100) in FIG. 1 and are therefore not necessarily redescribed below in detail.

The controller 210 connects to water dispenser 212, food dispenser 214, egg laying box 216, door actuator 218, water heater 220 through the water dispenser 212, weight scale 222, wireless communication data transmitter/receiver 224, thermometer 226, and power supply 228 (e.g., a photovoltaic cell, a battery, and/or an alternating current (AC) power source), and lamp 230. The controller 210 communicates with a server 224 and a client device 242 through the network 240 (e.g., a local area network and/or the Internet) using a wireless data communication 248. In aspects, the controller 210 includes a processor that is configured to execute operations of the monitoring device (e.g., the monitoring device 104 as shown in FIG. 1).

The water dispenser 212 includes a water level sensor (e.g., the water level sensor 122 as shown in FIG. 1) and a water intake valve 220 (e.g., the water valve actuator 142 as shown in FIG. 1).

The food dispenser 214 dispenses food in the hen house in response to receiving a command from the controller 210 to dispense food. In aspects, the food dispenser 214 further includes a food level sensor (e.g., the food level sensor 124 as shown in FIG. 1).

The egg laying box 216 represents a designated location for the hen to lay eggs. The weight scale 222 attaches to the egg laying box 216 to measure a weight of eggs on the egg weight scale 222. In aspects, the egg sensor 130 may determine a number of eggs based on a predetermined average weight of an egg.

The door actuator 218 opens and closes the door 208 of the hen house 201 according to a command received from the command transmitter (e.g., the command transmitter 118 as shown in FIG. 1.

The wireless data transmitter/receiver 224 transmits the dashboard data from the controller 210 and receives command data from the client device 242 and the server 244 as wireless communication 248 through the network 240. In aspects, the wireless data transmitter/receiver 224 receives sensor data from the respective sensors (e.g., a weight value as sensed by the weight scale 222) and sends the sensor data to the controller 210. In some other aspects, the wireless data transmitter/receiver 224 receives command data from the controller 210 and transmits the command data to one or more actuators (e.g., the food dispenser 214).

The thermometer 226 measures temperature data of inside and/or outside the hen house 201 to send the temperature data to the controller 210.

The power supply 228 supplies electric power to the controller 210, sensors (e.g., the thermometer 226), and actuators (e.g., the food dispenser 214). In aspects, the power supply 228 includes a photovoltaic cell (e.g., a solar panel) to generate and store the electric power.

The lamp 230 lights inside/outside the hen house 210. In aspects, the lamp 230 includes a light sensor (e.g., the light sensor 120 as shown in FIG. 1) and a light switch (e.g., the light switch 140 as shown in FIG. 1).

The server 244 connects to a database 246. While server 244 is illustrated separately from database 246, it will be appreciated that server 244 may include database 246 in some examples. The database 246 stores data retrieved from sensors attached to devices installed in the hen house 201 (e.g., the water dispenser 212, the food dispenser 214, the weight scale 222, the egg laying box, 216, the door 208, and the like). Additionally, or alternatively, the controller 219 may connect to the internet 240 through a fixed line (not shown in FIG. 2).

FIG. 3 illustrates an example of conditions and commands in accordance with aspects of the present disclosure. The example 300 includes command rules 302, which may be used by a controller (e.g., monitoring device 104 and/or controller 210 in FIGS. 1 and 2, respectively) to control actuators to perform tasks in response to one or more predetermined conditions, thereby maintaining conditions for hens in the hen house. The command rules 302 includes condition 304 and command 306. In aspects, a command rule database (e.g., the command rule database 164 as shown in FIG. 1) stores command rules.

In examples, a command causes the controller to generate an alert (e.g., in a dashboard and/or to a user's device) to inform the user to check the egg laying box in the hen house, for example when the weight scale indicates that a weight on the egg laying box is higher than a predetermined weight value (e.g., a daily average weight on the egg laying box as a hen lays eggs on the egg laying box).

In examples, a command rule may cause the controller to generate a command that instructs the heater to turn on heating of the water in the water dispenser to prevent the water from freezing, for example when the thermometer indicates that the water temperature is within a predetermined threshold of a freezing point. In other examples, a command rule may cause the controller to generate a command that instructs the door actuator to keep the door of the hen house open beyond a normal time for closing the door to prevent shutting out hens outside the hen house, for example in response to the thermometer indicating that the outdoor temperature is lower than a predetermined threshold at a predetermined time of the day.

In other examples, a command rule may cause the controller to generate a command that instructs the vitamin/treat dispenser to activate dispensing the vitamin/treat for hens and further instructs the door actuator to delay closing of the door for a predetermined time to prevent the hens from being trapped outside the hen house, for example in response to a hen counter indicating that a count of hen inside the hen house is below a predetermined threshold (i.e., some hens remain outside the hen house at the time to close the door of the hen house).

In some other examples, a command rule causes the controller to display a warning message in the dashboard of the client device about a possible spoiling of eggs and causes the controller to activate the exhaust fan to generate air circulation inside the hen house to keep the eggs on the egg laying box cool, for example in response to the thermometer indicating that a temperature inside the hen house if higher than a predetermined threshold and the weight scaling detecting a weight of at least an egg on the egg laying box.

As will be appreciated, the command rules 302 described with respect to FIG. 3 are not intended to limit use of the example 300. Accordingly, additional and/or alternative examples may be used to practice the methods and systems herein and/or features and applications described may be excluded without departing from the methods and systems disclosed herein.

Figures 4A, 4B:
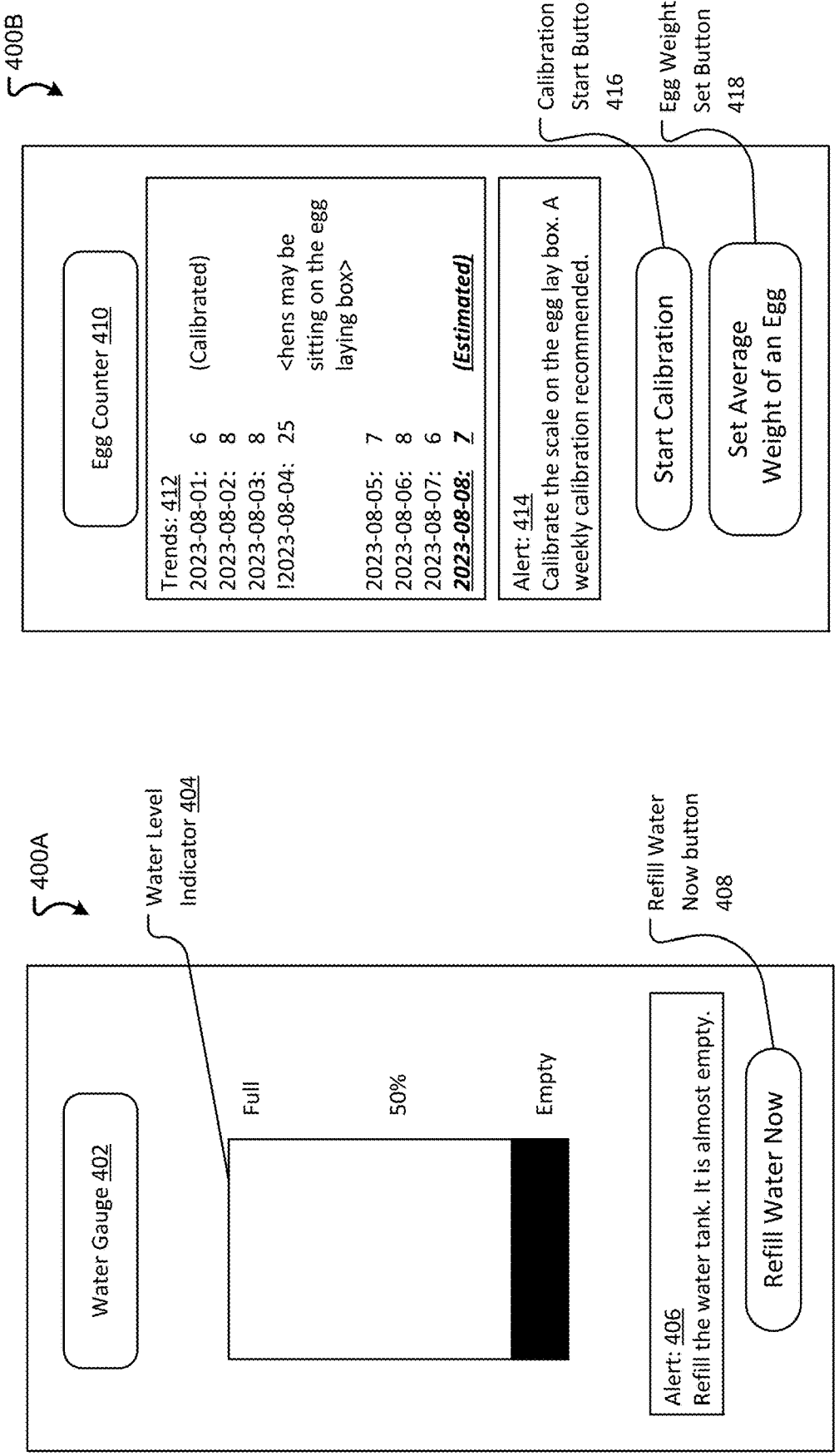

FIGS. 4A-D illustrate examples of graphical user interface in accordance with aspects of the present disclosure. In examples, the example graphical user interfaces are displayed on the screen of a client device. In FIG. 4A, an example graphical user interface 400A indicates a water gauge 402 of a water dispenser in the hen house, an alert text 406, and a Refill Water Now button 408. In examples, water level indicator 404 indicates a level of water in the water dispenser (e.g., close to empty). Alert 406 section indicates an alert of "Refill the water tank. It is almost empty." The alert 406 and the water level indicator 404 informs the user of the client device about low level of water and thus suggests that the user refills the water tank. The Refill Water Now button 408 represents an interactive button for the user to select to start refilling the water tank. When the Refill Water Now button 408 is selected by the user, the client device (e.g., the client device 170 as shown in FIG. 1) sends a command for opening the water intake valve (e.g., the water intake valve 220 in FIG. 2) to the controller (e.g., the controller 210 as shown in FIG. 2). The command transmitter (e.g., the command transmitter 118 as shown in FIG. 1) of the monitoring device in the controller 210 transmits the command to water intake actuator (e.g., the water valve actuator 142 as shown in FIG. 1) to start refilling the water in the water dispenser (e.g., the water dispenser 212 in FIG. 2). In aspect, the water intake actuator automatically closes the water intake valve when a water level of the water dispenser reaches a predetermined threshold level and stops refilling the water. Additionally, or alternatively, the user may stop actuating the Refill Water Now button 408 to cause the water to stop refilling.

In FIG. 4B, an example graphical user interface 400B depicts egg counter 410 screen. The egg counter 410 screen indicates the number of eggs laid by hens (e.g., on a daily basis). The screen includes trends 412 section, alert 414, calibration start button 416, and set average weight of an egg button 418. The trends 412 indicates trends of a number of eggs laid on daily basis by listing dates and numbers of eggs for corresponding days. In aspects, the trends 412 indicate an expected number of eggs likely to be laid on a following date. For example, the trends 412 indicate six eggs on Aug. 1, 2023. The trends 412 further indicates that the weight scale in the egg laying box was calibrated on Aug. 1, 1023. The trends 412 further indicates eight eggs on August 2 and 3. It will be appreciated that, in examples, a user may specify a time period for which the user interface is generated (e.g., a date range and/or whether the data is displayed on a daily, weekly, or monthly basis).

In aspects, the trends 412 indicates an alert when a number of eggs as calculated by a weight on the egg laying box deviates from a predetermined threshold. The alert may indicate that the number of eggs as estimated from the weight on the egg laying box may be inaccurate because of the deviation. The alert may suggest that hen may be sitting on the egg laying box. For example, on Aug. 4, 2023, the trends 412 indicates that there are 25 eggs, as estimated from a weight on the egg laying box on that date. The alert indicates that hen may be sitting on the egg laying box because having twenty five eggs on a date would deviate from typical numbers of eggs (e.g., in a range of six and eight). In examples, the predetermined threshold of deviating from a number of eggs may be five eggs from an average number of eggs in a recent week. The trends 412 further indicates seven eggs as an estimated number of eggs on Aug. 8, 2023.

The alert 414 may indicate an alert to the user for recommending calibrating the weight scale in the egg laying box. For example, the alert 414 indicates "Calibrate the scale on the egg lay box. A weekly calibration is recommended." In aspects, the system computes and estimates a number of eggs laid for each day based on a measured weight on the egg laying box by dividing the measured weight by an average weight of an egg as specified by the user.

Calibration start button 416 starts calibrating the weight scale in the egg laying box. For example, the user of the client device may visit the hen house and select the calibration start button 416 after visually confirming that there is no egg or a hen on the egg laying box. The egg weight set button 418 enables a user to input a value of an average weight of an egg or a predetermined weight of an egg. The controller uses the value of an average weight of an egg to computer a number of eggs on the egg laying box by dividing a weight value as measured by the weight scale of the egg laying box by the value of an average weight of an egg.

Figure 4D:
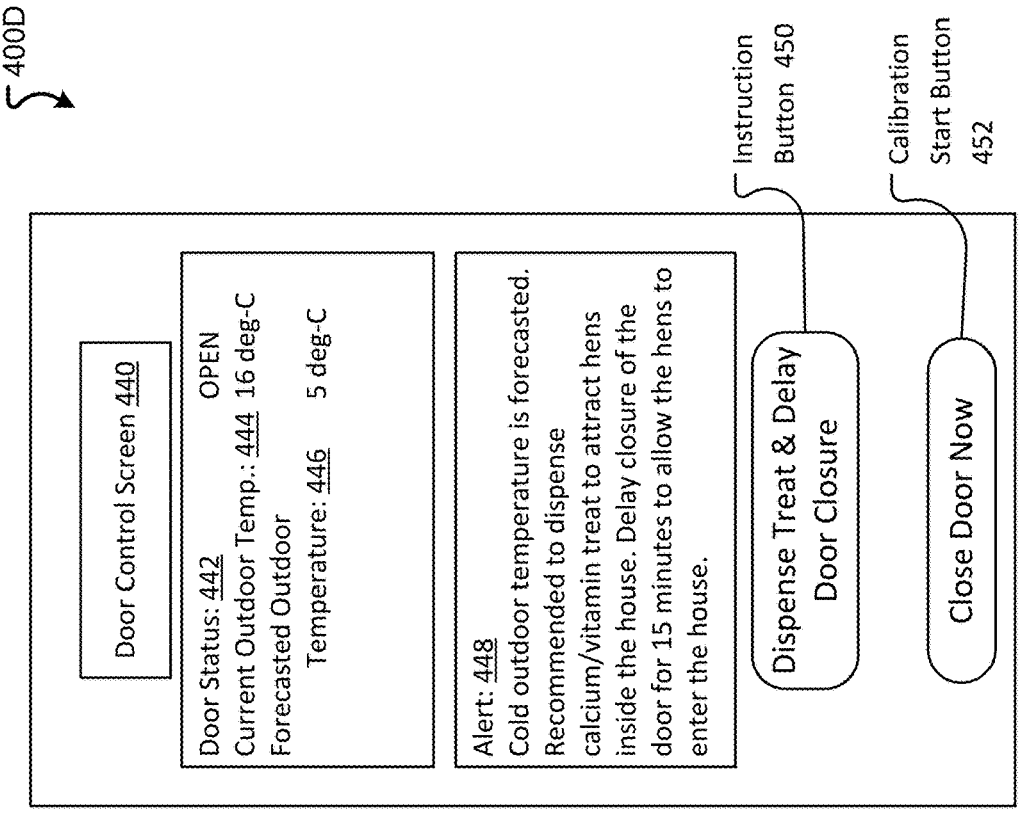
Figure 4C:
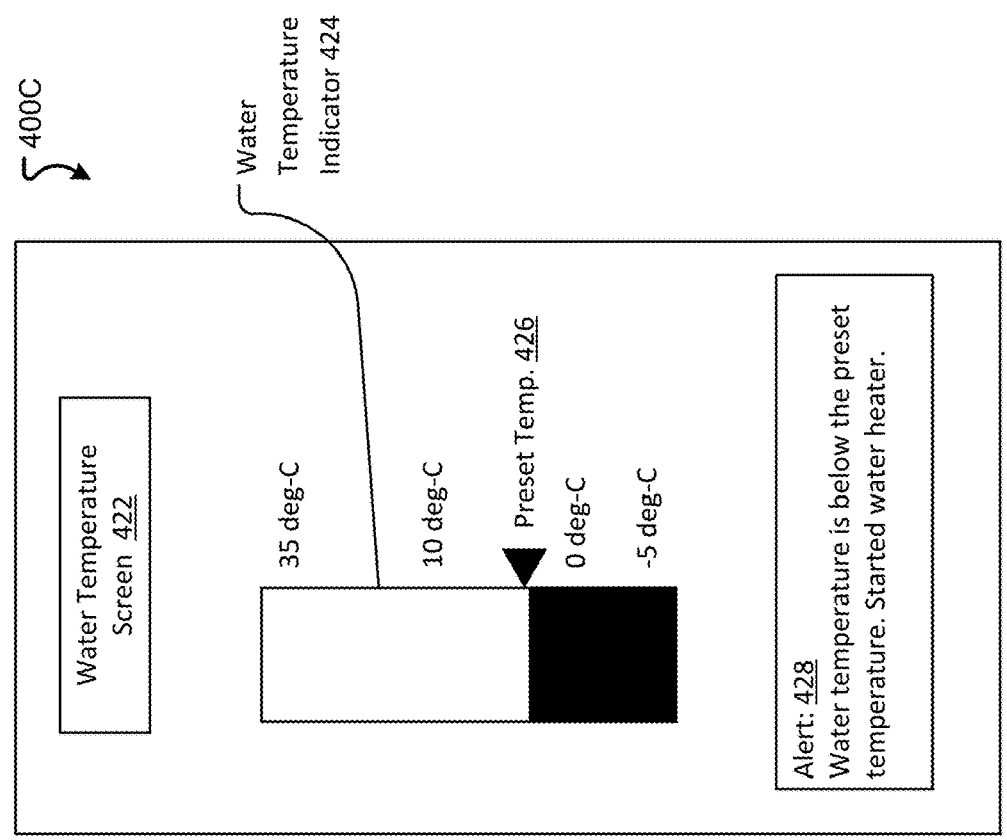

In FIG. 4C, an example graphical user interface 400C depicts water temperature screen 422. The water temperature screen 422 indicates a temperature of water in the water dispenser in the hen house. Water temperature indicator 424 indicates the present water temperature. Preset temperature 426 indicates a predetermined threshold temperature with which to turn ON/OFF a water heater, thereby maintaining the water temperature according to the predetermined threshold. For example, the controller may activate a water heater when the water temperature is below the preset temperature 426. The alert 428 indicates an alert to the user about water temperature. For example, the alert 428 indicates "Water temperature is below the preset temperature. Started water heater." In aspects, the controller automatically activates the water heater when the water temperature falls below the preset temperature 426.

In FIG. 4D, an example graphical user interface 400D illustrates door control screen 440. The door control screen 440 indicates a status of the door of the hen house. The example door control screen 440 further indicates door status 442, a current outdoor temperature 444, forecasted outdoor temperature 446, and an alert 448. In examples, the door status 442 indicates the door status as "OPEN," the current outdoor temperature 444 at 16 degrees Celsius, and a forecasted outdoor temperature 446 of 5 degrees Celsius. The alert 448 is an example that indicates an alert to the user of the client device about the low temperature and how to react to the low temperature situation. The alert 448 indicates "Cold outdoor temperature is forecasted. Recommended to dispense calcium/vitamin treat to attract hens inside the house, Delay closure of the door for 15 minutes to allow the hens to enter the hen house."

Instruction button 450, when selected by the user, initiates dispensing treats and delaying closure of the door to increase a chance of having all the hens inside the hen house before the temperature outside becomes too cold for the hens. Close door now 452 button, when selected, immediately closes the door of the hen house.

As will be appreciated, the various methods, devices, applications, features, etc., described with respect to FIGS. 4A-D are not intended to be limited to use of the graphical user interfaces 400A-400D. Accordingly, additional data structures or configurations may be used to practice the methods and systems herein and/or features and applications described may be excluded without departing from the methods and systems disclosed herein.

FIG. 5 illustrates an example method for monitoring and maintaining an automated hen house in accordance with aspects of the present disclosure. A general order of the operations for the example method 500 is shown in FIG. 5. Generally, the method 500 begins with start operation 502. The method 500 may include more or fewer steps or may arrange the order of the steps differently than those shown in FIG. 5. The method 500 can be executed as a set of computer-executable instructions executed by a cloud system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-D, 6, and 7.

Following start operation 502, the method 500 begins with receive operation 504, which receives sensor data from one or more sensors installed in or in vicinity of the hen house. An example of the sensor date may include but not limited to temperatures inside/outside the hen house, water temperature, a water level of a water dispenser, a door status, a weight on the egg laying box, and the like. Example sensors were described above with respect to FIGS. 1 and 2 and are therefore not redescribed in detail.

At generate trends data operation 506, trends data of a state of the hen house, hens and/or eggs are generated. Examples of trend data may include, but are not limited to, a daily trend of a number of eggs and an expected number of eggs on a following day, a change in indoor and outdoor temperatures of the hen house, and the like. In aspects, the controller may generate trends data based on the sensor data. In some other aspects, the controller may upload the sensor data to the server. Given the sensor data, the server may generate the trends data with computing resources available at the server. In aspects, the server may have more computing resources than the controller to perform a data analysis to generate the trends data.

At update operation 508, sensor data and trend data may be updated on a dashboard for display in the client device. In examples, the dashboard provides an overview of the sensor data and trends data for the user. The dashboard may be linked to various pages with more detailed information about specific areas of monitoring hens, eggs, and the hen house.

At determine command operation 510, a command for execution is determined. In particular, given the received sensor data and the determined trends data as a condition, the controller determines a command according to a set of predetermined command rules (e.g., FIG. 3). In aspects, the set of predetermined command rules may be stored in a memory of the controller. In some other aspects, the set of predetermined command rules may be stored in a database that is connected to a server. In aspects, the server may receive the sensor data from the controller and store in the database indexed by types of sensors and dates. The server may retrieve the sensor data and the trends data from the database At dispatch operation 512, the determined command may be dispatched to respective actuators for execution. In aspects, the controller transmits the determined command to one or more actuators in or in vicinity of the hen house. For example, the dispatched command may instruct the door actuator to close the door of the hen house.

After executing the dispatch operation 512, the method 500 may return to the receive operation 504 to receive sensor data to iteratively execute steps of the method 500.

As should be appreciated, operations 502-512 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 illustrates an example method for monitoring eggs in accordance with aspects of the present disclosure. A general order of the operations for the example method 600 is shown in FIG. 6. Generally, the method 600 begins with start operation 602 and end with end operation 614. The method 600 may include more or fewer steps or may arrange the order of the steps differently than those shown in FIG. 6.

The method 600 can be executed as a set of computer-executable instructions executed by a cloud system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4A-D, 5, and 7.

Following start operation 602, the method 600 begins with receive operation 604, which receives weight data from the egg laying box in the hen house. In aspects, the receive operation 604 include receiving, by a controller (e.g., the controller 210 as described in FIG. 2), the weight data by using a wired connection between the controller and a weight scale (e.g., the weight scale 222 as shown in FIG. 2). Additionally, or alternatively, the receive operation 604 receives the weight data through Bluetooth, Wi-Fi, or other wireless communication. In examples, weight data may include numerical data that represent a total weight of eggs on an egg laying box (e.g., the egg laying box 216 as shown in FIG. 2) as measured by the weight scale.

At retrieve operation 606, daily egg quantity data may be retrieved from sensor data log database. In aspects, the sensor data log database stores sensor data over time. In examples, the sensor data log database connects to a server. The controller may receive the sensor data from sensors and transmit the sensor data to the server. The server may store the received sensor data in the sensor data log database. The sensor data log database may store the sensor data indexed and searchable by a date, a type of a sensor, and the like. In examples, the retrieve operation 606 retrieves the daily egg quantity data from the sensor data log database based on a date. Additionally, alternatively, the server performs the retrieve operation 606 by receiving the egg the weight data and accessing the sensor data log database.

At determine operation 608, a number of eggs on the egg laying box is determined. In particular, the determine operation 608 determines the number of eggs by computing a quotient value of a total weight measured by a weight scale on the egg laying box by a predetermined average weight of an egg. It will be appreciated that any of a variety of additional and/or alternative techniques may be used to determine a number of eggs on the egg laying box according to aspects described herein.

At generate operation 610, trends data of daily number of eggs is generated. In aspects, the server may retrieve a set of daily numbers of eggs laid during the recent days. A range of the recent days may be predetermined by the user or the system (e.g., a week, ten days, a month, and the like). In examples, the generate operation 610 extrapolates number of eggs over one or more future dates as expected numbers of eggs based on the retrieved set of daily numbers of eggs. An example of an expected number of eggs may indicate "ten eggs expected tomorrow" or "40 eggs expected next week." The expected number of eggs may represent the generated trends data.

At display operation 612, the generated trends data are displayed on the client device. For example, the client device may display "ten eggs expected tomorrow" as a trends message to the user. The method 600 ends with the end operation 614. In aspects, the method 600 may be executed periodically or in response to occurrence of a predetermined event based on a state of the hen house, the hen, and the eggs in the hen house.

As should be appreciated, operations 602-614 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 illustrates a simplified block diagram of a device with which aspects of the present disclosure may be practiced in accordance with aspects of the present disclosure. The device, which represent at least a part of the electrophysiology system, may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (e.g., instructions for collecting sensor data, generating trends data, generating a command, and dispatching the command for display on a dashboard and subsequent pages in the client device as disclosed herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by the at least one processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The present disclosure relates to a device for controlling one or more actuators for a hen house. The device comprises receiving sensor data from a sensor of a plurality of sensors in a hen house, wherein the sensor data indicate a condition of the hen house; generating, based on the sensor data, trend data of the hen house; and determining, based on the trend data and a predetermined rule, a command for controlling the hen house; transmitting the command data, causing an actuator to perform operations according to the command data. The processor is further configured to execute operations comprising generating, based on the trend data, dashboard data; and transmitting the dashboard data to a client device, thereby causing the client device to display the dashboard data on the client device. The sensor data includes at least one of: temperature data of the hen house, water level data, food level data, door position data, temperature data, or a weight value of one or more eggs. The command data include at least one of: activating a light inside the hen house, opening a water intake valve, dispensing food, opening a door of the hen house, activating an air conditioner of the hen house, activating a heater of a cage in the hen house, activating an exhaust fan of the hen house, or dispensing a treat food in the hen house. The predetermined rule includes at least one of: when a weight of an egg laying box is higher than a predetermined value, generating an alert to check the egg laying box for a hen sitting on the egg laying box, when a temperature value of water is below a predetermined threshold water temperature value of a freezing point, activating a water heater for preventing a water freeze, or when an outdoor temperature is lower than a predetermined threshold temperature value, opening a door of the hen house for a predetermined time. The predetermined rule includes: when a count of hens inside the hen house is less than a predetermined threshold count: generating a first command to activate a food level in the hen house for attracting hens from outside the hen house, generating a second command to open a door of the hen house for a predetermined time for preventing the hens from being trapped outside the hen house, transmitting the first command and the second commands, and receiving the sensor data, wherein the sensor data includes a food supply level and a door status. The predetermined rule includes: when a measured temperature inside the hen house is above a predetermined threshold temperature: retrieving a time of an increase in a measured weight by a weight scale of an egg laying box, determining an amount of time elapsed since an increase of weight value on an egg laying box, generating, based on the amount of time elapsed and a predetermined amount of time, an alert message, wherein the alert message indicates that an egg may be spoiled after the predetermined amount of time has elapsed according to the measured temperature, transmitting the alert message, and generating a command to activate an exhaust fan of the hen house. The dashboard data includes an interactive display screen to display a water level, an alert, and an interactive button for refilling a water supply.

Another aspect of the technology relates to a device. The device comprises a processor configured to execute operations comprising receiving sensor data from a plurality of sensors, wherein the sensor data includes: a brightness status indicating a level of brightness inside the hen house, a water level status indicating a level of water in a water dispenser, a food level status indicating a level of food in a food dispenser, a door status indicating a status of a door of the hen house, a temperature value indicating a temperature of the hen house, and a number of eggs in a laying box; determining control data from the plurality of sensors, wherein the control data includes: a light switch status indicating a state of a light in the hen house, a water switch status indicating a water solenoid value, a food dispensing status indicating a status associated with dispensing food, a door status indicating a status of the door, and a water heat switch status indicating a state of the water heat switch; and storing a combination of the sensor data and the control data in a memory; transmitting the combination of the sensor data and the control data to a data store through a wireless network; and generating, based at least on the combination of the sensor and the control data, dashboard data, wherein the dashboard data; transmitting the dashboard data, causing display of a dashboard, wherein the dashboard represents graphical user interface based on the dashboard data.

Yet another aspect of the technology relates to a method for controlling one or more actuators of a hen house. The method comprises receiving sensor data from a sensor of a plurality of sensors in a hen house, wherein the sensor data indicate a condition of the hen house; generating, based on the sensor data, trend data of the hen house; determining, based on the trend data and a predetermined rule, a command for controlling the hen house; and transmitting the command, causing an actuator to perform operations according to the command. The method further comprises generating, based on the trend data, dashboard data; and transmitting the dashboard data to a client device, thereby causing the client device to display the dashboard data on the client device. The sensor data includes at least one of: temperature data of the hen house, water level data, food level data, door position data, temperature data, or a weight value of one or more eggs. The command comprises at least one of: activating a light inside the hen house, opening a water intake valve, dispensing food, opening a door of the hen house, activating an air conditioner of the hen house, activating a heater of a cage in the hen house, activating an exhaust fan of the hen house, or dispensing a treat food in the hen house. The predetermined rule includes at least one of: when a weight of an egg laying box is higher than a predetermined value, generating an alert to check the egg laying box for a hen sitting on the egg laying box, when a temperature value of water is below a predetermined threshold water temperature value of a freezing point, activating a water heater for preventing a water freeze, or when an outdoor temperature is lower than a predetermined threshold temperature value, opening a door of the hen house for a predetermined time. The predetermined rule includes: when a count of hens inside the hen house is less than a predetermined threshold count: generating a first command to activate a food level in the hen house for attracting hens from outside the hen house, generating a second command to open a door of the hen house for a predetermined time for preventing the hens from being trapped outside the hen house, transmitting the first command and the second command, and receiving the sensor data, wherein the sensor data includes a food supply level and a door status. The predetermined rule includes: when a measured temperature inside the hen house is above a predetermined threshold temperature: retrieving a time of an increase in a measured weight by a weight scale of an egg laying box, determining an amount of time elapsed since an increase of weight value on the egg laying box, generating, based on the amount of time elapsed and a predetermined amount of time, an alert message, wherein the alert message indicates that an egg may be spoiled after the predetermined amount of time has elapsed according to the measured temperature, transmitting the alert message, and generating a command to activate an exhaust fan of the hen house. The dashboard data includes an interactive display screen to display a water level, an alert, and an interactive button for refilling a water supply.

Any of the one or more above aspects in combination with any other of the one or more aspect. Any of the one or more aspects as described herein.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A device for controlling one or more actuators of a hen house, the device comprising a processor configured to execute operations comprising:
receiving sensor data from a sensor of a plurality of sensors in a hen house, wherein the sensor data indicate a condition of the hen house;
generating, based on the sensor data, trend data of the hen house;
determining, based on the trend data and a predetermined rule, a command for controlling the hen house,
wherein the predetermined rule includes:
when a measured temperature inside the hen house is above a predetermined threshold temperature:
retrieving a time of an increase in a measured weight by a weight scale of an egg laying box,
determining an amount of time elapsed since an increase of weight value on the egg laying box, generating, based on the amount of time elapsed and a predetermined amount of time, an alert message, wherein the alert message indicates that an egg may be spoiled after the predetermined amount of time has elapsed according to the measured temperature, transmitting the alert message, and generating the command to activate an exhaust fan of the hen house; and transmitting the command, causing an actuator to perform operations according to the command.

2. The device according to claim 1, the processor further configured to execute operations comprising:

generating, based on the trend data, dashboard data; and transmitting the dashboard data to a client device, thereby causing the client device to display the dashboard data on the client device.

3. The device according to claim 1, wherein the sensor data includes:

temperature data of the hen house, water level data, food level data, door position data, temperature data, or a weight value of one or more eggs.

4. The device according to claim 1, wherein the command additionally comprises at least one of:

activating a light inside the hen house, opening a water intake valve, dispensing food, opening a door of the hen house, activating an air conditioner of the hen house, activating a heater of a cage in the hen house, or dispensing a treat food in the hen house.

5. The device according to claim 1, wherein the predetermined rule includes at least one of:

when a temperature value of water is below a predetermined threshold water temperature value of a freezing point, activating a water heater for preventing a water freeze, or when an outdoor temperature is lower than a predetermined threshold temperature value, opening a door of the hen house for a predetermined time.

6. The device according to claim 1, wherein the predetermined rule includes:

when a count of hens inside the hen house is less than a predetermined threshold count:

generating a first command to activate a food level in the hen house for attracting hens from outside the hen house, generating a second command to open a door of the hen house for a predetermined time for preventing the hens from being trapped outside the hen house, transmitting the first command and the second command, and receiving the sensor data, wherein the sensor data includes a food supply level and a door status.

7. The device according to claim 2, wherein the dashboard data includes an interactive display screen to display a water level, an alert, and an interactive button for refilling a water supply.

8. A device comprising:

a processor configured to execute operations comprising:

receiving sensor data from a plurality of sensors, wherein the sensor data includes:

a brightness status indicating a level of brightness inside the hen house, a water level status indicating a level of water in a water dispenser, a food level status indicating a level of food in a food dispenser, a door status indicating a status of a door of the hen house, a weight value of one or more eggs, a temperature value indicating a temperature of the hen house, and a number of eggs in a laying box;

determining, based on a predetermined rule, control data from the plurality of sensors, wherein the control data includes:

a light switch status indicating a state of a light in the hen house, a water switch status indicating a water solenoid value, a food dispensing status indicating a status associated with dispensing food, a door status indicating a status of the door, and a water heat switch status indicating a state of the water heat switch, wherein the predetermined rule includes:

when a measured temperature inside the hen house is above a predetermined threshold temperature:

retrieving a time of an increase in a measured weight by a weight scale of an egg laying box, determining an amount of time elapsed since an increase of weight value on the egg laying box, generating, based on the amount of time elapsed and a predetermined amount of time, an alert message, wherein the alert message indicates that an egg may be spoiled after the predetermined amount of time has elapsed according to the measured temperature, transmitting the alert message, and generating a command to activate an exhaust fan of the hen house; and storing a combination of the sensor data and the control data in a memory;

transmitting the combination of the sensor data and the control data to a data store through a wireless network; and generating, based at least on the combination of the sensor data and the control data, dashboard data;

transmitting the dashboard data, causing display of a dashboard, wherein the dashboard represents a graphical user interface based on the dashboard data.

9. A method for controlling one or more actuators of a hen house, comprising:

a device comprising a processor configured to execute operations comprising:

receiving sensor data from a sensor of a plurality of sensors in a hen house, wherein the sensor data indicate a condition of the hen house;

generating, based on the sensor data, trend data of the hen house;

determining, based on the trend data and a predetermined rule, a command for controlling the hen house, wherein the predetermined rule includes:

when a measured temperature inside the hen house is above a predetermined threshold temperature:

retrieving a time of an increase in a measured weight by a weight scale of an egg laying box, determining an amount of time elapsed since an increase of weight value on the egg laying box, generating, based on the amount of time elapsed and a predetermined amount of time, an alert message, wherein the alert message indicates that an egg may be spoiled after the predetermined amount of time has elapsed according to the measured temperature, transmitting the alert message, and generating the command to activate an exhaust fan of the hen house; and transmitting the command, causing an actuator to perform operations according to the command.

10. The method according to claim 9, further comprising:

generating, based on the trend data, dashboard data; and transmitting the dashboard data to a client device, thereby causing the client device to display the dashboard data on the client device.

11. The method according to claim 9, wherein the sensor data includes:

temperature data of the hen house, water level data, food level data, door position data, temperature data, or a weight value of one or more eggs.

12. The method according to claim 9, wherein the command additionally comprises at least one of:

activating a light inside the hen house, opening a water intake valve, dispensing food, opening a door of the hen house, activating an air conditioner of the hen house, activating a heater of a cage in the hen house, or dispensing a treat food in the hen house.

13. The method according to claim 9, wherein the predetermined rule includes at least one of:

when a temperature value of water is below a predetermined threshold water temperature value of a freezing point, activating a water heater for preventing a water freeze, or when an outdoor temperature is lower than a predetermined threshold temperature value, opening a door of the hen house for a predetermined time.

14. The method according to claim 9, wherein the predetermined rule includes:

when a count of hens inside the hen house is less than a predetermined threshold count:

generating a first command to activate a food level in the hen house for attracting hens from outside the hen house, generating a second command to open a door of the hen house for a predetermined time for preventing the hens from being trapped outside the hen house, transmitting the first command and the second command, and receiving the sensor data, wherein the sensor data includes a food supply level and a door status.

15. The method according to claim 10, wherein the dashboard data includes an interactive display screen to display a water level, an alert, and an interactive button for refilling a water supply.

* * * * *